US007865383B2

(12) United States Patent
Tafoya

(10) Patent No.: US 7,865,383 B2
(45) Date of Patent: Jan. 4, 2011

(54) SYSTEM AND METHOD FOR EXAMINING, DESCRIBING, ANALYZING AND/OR PREDICTING ORGANIZATION PERFORMANCE IN RESPONSE TO EVENTS

(76) Inventor: Dennis William Tafoya, 1 Gwen La., Devon, PA (US) 19333-1023

( * ) Notice: Subject to any disclaimer, the term of this patent is extended or adjusted under 35 U.S.C. 154(b) by 1068 days.

(21) Appl. No.: 11/581,179

(22) Filed: Oct. 16, 2006

(65) Prior Publication Data
US 2007/0299720 A1    Dec. 27, 2007

Related U.S. Application Data

(60) Provisional application No. 60/815,851, filed on Jun. 23, 2006.

(51) Int. Cl.
G06Q 10/00    (2006.01)
(52) U.S. Cl. ............................ 705/7; 705/10
(58) Field of Classification Search ........... 705/7, 705/10
See application file for complete search history.

(56) References Cited

U.S. PATENT DOCUMENTS

| | | | | | |
|---|---|---|---|---|---|
| 4,656,867 | A | * | 4/1987 | Sasaki | 73/170.16 |
| 5,164,983 | A | * | 11/1992 | Brown et al. | 379/265.03 |
| 5,521,813 | A | * | 5/1996 | Fox et al. | 705/8 |
| 5,585,558 | A | * | 12/1996 | Zhelonkin et al. | 73/170.24 |
| 5,875,431 | A | * | 2/1999 | Heckman et al. | 705/7 |
| 5,999,908 | A | * | 12/1999 | Abelow | 705/7 |
| 6,389,331 | B1 | * | 5/2002 | Jensen et al. | 700/275 |
| 6,405,159 | B2 | * | 6/2002 | Bushey et al. | 703/13 |
| 6,411,936 | B1 | * | 6/2002 | Sanders | 705/10 |
| 6,556,974 | B1 | * | 4/2003 | D'Alessandro | 705/10 |
| 6,708,155 | B1 | * | 3/2004 | Honarvar et al. | 705/7 |
| 6,751,650 | B1 | * | 6/2004 | Finch et al. | 709/203 |
| 6,834,274 | B2 | * | 12/2004 | Tafoya | 706/50 |
| 6,985,771 | B2 | * | 1/2006 | Fischell et al. | 607/3 |
| 6,990,437 | B1 | * | 1/2006 | Abu El Ata | 703/2 |

(Continued)

OTHER PUBLICATIONS

BusinessWire, "Gensym introduces internet connectivity for its G2 family of intelligent real-time software", Mar. 18, 1996, p3181278, Dialog 04253204 46228618.*

(Continued)

*Primary Examiner*—Jonathan G. Sterrett

(57) ABSTRACT

A system and method for examining, describing, analyzing and/or predicting an organization's emerging levels of performance during routine, special and unexpected events are presented. The tools include a methodology and processes for systematically building, collecting and archiving profiles of the performance capacity within specific organizations or across wider industry or cultural groups. The use of various unique and precise ways to observe, classify, measure and, analyze organizations and the events they are expected to manage allows for discussions of an organization's current ability to perform and the development and testing of projections or forecasts of future performance. Finally, having the option to speculate or to develop what-if scenarios extends the overall usefulness of the device described herein beyond reviews of how an organization is currently, to broader discussions of the organization's general capacity to withstand threats, challenges or attacks emerging from within or outside. In this last analysis, particular emphasis is placed on identifying, monitoring and measuring potential threats, challenges or attacks arising from intentional, constructed efforts of others (i.e., other individuals or organizations) versus those threats, challenges or attacks associated with factors beyond the organization's control, for example, economic or weather-related conditions.

1 Claim, 13 Drawing Sheets

U.S. PATENT DOCUMENTS

| | | | | |
|---|---|---|---|---|
| 6,993,402 | B2* | 1/2006 | Klass et al. | 700/103 |
| 7,035,809 | B2* | 4/2006 | Miller et al. | 705/8 |
| 7,296,070 | B2* | 11/2007 | Sweeney et al. | 709/224 |
| 7,596,608 | B2* | 9/2009 | Alexander et al. | 709/217 |
| 2003/0187716 | A1* | 10/2003 | Lee | 705/10 |
| 2004/0059627 | A1* | 3/2004 | Baseman et al. | 705/10 |
| 2004/0068429 | A1* | 4/2004 | MacDonald | 705/10 |
| 2004/0093232 | A1* | 5/2004 | Murray | 705/1 |
| 2004/0107125 | A1* | 6/2004 | Guheen et al. | 705/7 |

OTHER PUBLICATIONS

Heath, Jenny, "Expert Systems resource guide (directory of software tools)", Apr. 1994, AI Expert, v9, n4, p. 40(10), Dialog 01674771 15064069.*

Organizational structure, environment and performance [PDF] from osu.edu J Child—Strategy: critical perspectives on business and . . . , 2002—books.google.com.*

Organizational configurations and performance: A meta-analysis [PDF] from jstor.org DJ Ketchen Jr, JG Combs, CJ Russell, C Shook, . . . - . . . of Management Journal, 1997—JSTOR.*

* cited by examiner

Figure 2

People and Groups, Organizations and Institutions ©

All of us belong to different groups or organizations. These may be companies where we work, religious organizations, or recreational groups or social and professional clubs. This study examines characteristics defining modern organizations by having you think about a specific organization, like where you work or volunteer your time. Think about how it feels to be part of that organization. So, don't think about how you might want the organization to be – think about how it is! Responses are CONFIDENTIAL. If you have any questions regarding the study or results, contact us directly.

To begin we need to know the type of organization you are thinking about. We do not need to know the organization's name just the TYPE. For example, if it is a business or company, a volunteer group, a social club, religious organization or, maybe a labor union or military unit, write that. If it's a company with offices across the country, use your plant or office. Write the type of organization in the space to the right:_____

| | The statements that follow describe different organizational environments. Read the statements and use the scale at the right to indicate how well the statement fits your organization. Some statements may not seem to apply to your organization. Regardless, rate each statement. | This is Excellent! This is who we are. | This fits Very Well. This is a very good description. | This fits Well. This is a good description. | This fits OK; it's close. | This Doesn't Fit Us At All! This is not who we are! |
|---|---|---|---|---|---|---|
| 1 | Doing what's expected of me usually doesn't require that I do things with others. | | | | | |
| 2 | It's not necessary to have someone tell me what to do or how to behave in this organization. I know what's expected of me and I do it. | | | | | |
| 3 | This organization is structured; it seems there are rules for everything and you have to follow the rules. | | | | | |

Figure 3

| Enterprise | Team/Group |
|---|---|
| This organization is dominated by structure. Policies and procedures, job descriptions and project plans for use as guides to direct membership.<br><br>Getting the job done is most important. Skills and competencies, communication with others and, day-to-day activity _must_ end in results. Relationships around here are business relationships. | Being part of a team drives this organization. If you "make the team" or prove yourself, you are accepted—others are outsiders.<br><br>Skills and competencies contribute to the team, communication centers on the team, and performance reflects the team's work. Individual performance is important, but performance with the team is most important. |
| Community | Individual |
| Beliefs, mission or, "reason for existing" define this organization. Skills can be useful but energy and effort are critical.<br><br>The place is like one big family. It is not that there are no boundaries or structure, because there are. Everything is linked to the relationships participants have with each other. | Participants tend to work alone around here. Know what is expected and do it. If interactions with others are not necessary they don't happen.<br><br>Participants are like individual contributors with the skills to get things done without others. |

Figure 4

Knowledge Management practices range from expected pedagogical activities (training, teaching, mentoring, observation) to include the development of ways of thinking designed to advance learning and understanding so that competency and skills benchmarks enable performance beyond intuition or inspirational starting points.

Relationship Management practices include a range of behaviors and practices that produce a state or feeling of nearness between or among individuals and/or organizations such that one can speak about or assess these relationships in terms of such descriptors as their quality, value or importance.

Communication Management practices enabling the initiation, development and maintenance of skills and competencies (e.g., in listening, speaking and writing) that facilitate the transmission and reception of information so that meaning is conferred and understanding achieved.

Evaluation Management practices are formal and informal examinations and assessments that estimate or determine value, effectiveness, performance or other criteria so that judgements or conclusions are possible.

Information Management practices designed to structure the flow of data (e.g., facts, attitudes, opinions and beliefs) between and among individuals or elements in a system.

Directional Practices linked to organizational values, culture, and ethics management (VCE's) practices that embrace, reflect and advance the philosophical nature and spirit of the organization and its membership.

Regulatory Management Practices that define policies and procedures (P&P) management practices that define, contain and/or support the establishment and execution of behavioral and performance parameters for individuals or the organization and its elements.

Figure 5

The Three Tiers of Organizational Competency:

Organization Competency  A.) Overall ability to deliver products and services that meet customer needs
　　　　　　　B.) capacity that enables the "customer" to participate

| Enterprise | Administrative |
|---|---|
| Ecological | |

Sub-Organization (e.g., Department) Competency (Departments that exist because of Span of Control issues are worthless/meaningless; Only that dept that exist because of contribution to profit are meaningful – production units, sports teams are examples.) Departments like Human Resources and payroll should be together; they have an audit function and support function.

| Specialization | Administrative |
|---|---|
| Environmental | Inter-organizational |

Individual Competency
Capability
History, experience (prior exposure), even if hypothetical.
At a minimum, the skills and capabilities needed to complete tasks or activities as defined. Ideally, the ability to adapt to changing situations. Competency can be classified by levels, ranging from novice to expert, and four categories: basic skills competencies, administrative, occupational/vocational and social/interpersonal. Experience training, wisdom, and judgement

| Professional | Administrative |
|---|---|
| Basic Skills | Social |

*Fig. 6*

| | | | |
|---|---|---|---|
| High Sense of Urgency. Emphasis on action. ("I/we will get on it right away. If we don't know what to do we'll find out or get help.") | | | |
| Moderate Sense of Urgency. ("If I/we have the time, resources, etc. we'll get on to it. How important is this issue?" | | Risk Level of the Issue or Problem | |
| Low Sense of Urgency ("We don't have time or it's a low priority. Shouldn't someone else be doing this?") | | | |
| | Novice | Intermediate | Expert |
| | Little technical knowledge or practical experience. Needs direct, sometimes continuous, guidance, monitoring or coaching . . . . | Has some foundation that reflects a mixture of a skills and competencies. Capable of handling a variety of situations. Can learn on the spot with greater accuracy and less risk than the novice by building off past experiences. Needs limited direct supervision, and then often consultative . . . . | Possesses technical knowledge and or practical experience concerning the issue in question. Are able to take a detached view, minimizing personal biases and preferences. Able to synthesize and conceptualize key issues defining or addressing the matter at hand, to take a holistic view, to perceive emerging themes associated with events, data, and other's opinions, attitudes or beliefs. . . . |

*Fig. 7*

| RATE RISK internal or external threats to general well-being or performance (e.g., from competition, economy, adversaries) | | RATE PERFORMANCE activity constructed to achieve stated goals (e.g., for quality, productivity, service, profitability) |
|---|---|---|
| Can come from Internal and External Sources<br>New, potential risks are always surfacing<br>Some risks are naturally occurring, others are created<br><br><br>High　　　　Moderate　　　　Low<br>Risk　　　　　　　　　　　Risk<br>-10 -9 -8 -7 -6 -5 -4 -3 -2 -1　0 | 10<br>9<br>8<br>7<br>6<br>5<br>4<br>3<br>2<br>1<br>0 | On-going but variable<br>Measured against expectations<br>Measured in comparison to competitors<br>The norm: performance is more proactive than reactive<br><br><br>Low　　　　Moderate　　　　High<br>Performance　　　　　　　　Performance<br>0　1　2　3　4　5　6　7　8　9　10 |
| -10 -9 -8 -7 -6 -5 -4 -3 -2 -1　0<br>High　　　　Moderate　　　　Low<br>Vunerability　　　　　　　Vunerability<br><br><br><br><br><br><br>Susceptibility to Risk<br>A function of Readiness and Risk | 0<br>-1<br>-2<br>-3<br>-4<br>-5<br>-6<br>-7<br>-8<br>-9<br>-10 | 0　1　2　3　4　5　6　7　8　9　10<br>Low　　　　Moderate　　　　High<br>Readiness　　　　　　　　Readiness<br><br><br><br><br><br>Measure of preparedness in terms of Risk<br>Readiness can be reactive (e.g., for a particular risk) Readiness can be proactive, which is desired |
| RATE VULNERABILITY susceptibility to threats to performance and/or general well-being | | RATE READINESS for anticipated and unanticipated events (e.g., managed via practices, policies, procedures, structure, etc.) |

*Fig. 8*

| Type I Event | Type II Event | Type III Event | Type IV Event |
|---|---|---|---|
| DESCRIPTION:<br><br>Planned, directly attributable to Mission, Goals, Objectives May be positive or negative, legal or illegal. Endogenous in orientation. | DESCRIPTION:<br><br>Event prompts some type of response. The event is directly attributable to, perhaps "caused" by the organization's presence, action, or inaction. In other words, "just being there" causes a reaction. Exogenous in orientation. | DESCRIPTION:<br><br>"Caused" by negligence, inattention, omission, recklessness, carelessness, slipshodness. It may come from within (e.g., a disgruntled participant) or outside (e.g., an attack by a competitor.) NOT LIKELY TO BE POSITIVE. Exogenous in orientation. | DESCRIPTION:<br><br>Not at all related to the Org (e.g., Act of God.) NOT LIKELY TO BE POSITIVE. Not at all related to the Organization EXCEPT that the Organization may have anticipated the "possibility" that it COULD (or not would) occur. Exogenous in orientation. |
| EXAMPLES:<br><br>A company's:<br>  recruiting effort or<br>  marketing program;<br>An army's:<br>  attack on a opponent;<br>  increase in troop strength;<br>An elected official's<br>  speech on immigration;<br>  meeting with a lobbyists;<br>A lawyer's:<br>  appeal to a judge;<br>  meeting with a client;<br>A terrorist's:<br>  detonation of a bomb;<br>  televised communiqué; | EXAMPLES:<br><br>A special interest group's:<br>  protests over policy<br>  fundraising for opponents<br>A competitor:<br>  releases new products<br>A terrorist attack<br>Workplace slowdown | EXAMPLES:<br><br>Employee's:<br>  theft of company property<br>  whistle blowing<br>A workplace accident<br>Union strike<br>A malpractice suit | EXAMPLES:<br><br>A natural disaster:<br>  a hurricane, earthquake<br>Theft of company property<br>An airline crash |

*Fig. 11*

Products
Products are 1st order outcomes. They are observable results of one's efforts. They are the things one does to do one's job, the ways one behaves, the decisions one makes, the actions one takes, the behaviors one displays, etc. P's can be good/bad, well or poorly done, "as expected" or "less than expected," etc.

Results
Results are 2nd order outcomes; they result from Products. It's a classic Stimulus Response or causal model. "You did 'x' and 'y' is a Result." There may be more than one Result associated with Products. Results can be good or bad, desirable or not, etc.

Impacts
Impacts are 3rd order outcomes. Impacts are the end-result of the Products and Results. Their presence can be long lasting, can unfold in other areas (i.e., not originally associated with the Products or actions taken in the first place.) Impacts can be viewed as the REAL payoff, either good or bad.

Consequences
Consequences are what emerge as a result of the ENTIRE stream: the Products, Results, and Impacts. Consequences are the "conclusion" for this Product, Result, Impact sequence. But this doesn't mean the end of the story. The overall "effects process" is continuous and on-going. Consequences, reverberations, repercussions are ways to describe "consequences."

SYSTEM AND METHOD FOR EXAMINING, DESCRIBING, ANALYZING AND/OR PREDICTING ORGANIZATION PERFORMANCE IN RESPONSE TO EVENTS

CROSS-REFERENCES TO RELATED APPLICATIONS CITED

Related Application(s)

This application claims the benefit of U.S. Provisional Application No. 60/815,851 filed Jun. 23, 2006, the entire teachings of which are incorporated herein by reference.

This application claims the benefit of U.S. Provisional Application No. 60/815,851 filed Jun. 23, 2006, the entire teachings of which are incorporated herein by reference.

U.S. PATENT DOCUMENTS

| | | |
|---|---|---|
| 4,656,867 | April 1987 | Sasaki |
| 5,164,983 | November 1992 | Brown et al. |
| 5,521,813 | May 1996 | Fox et al. |
| 5,585,558 | December 1996 | Zhelonkin |
| 6,003,402 | January 2006 | Klass et al. |
| 6,389,331 | May 2002 | Jensen et al. |
| 6,751,650 | June 2004 | Finch et al. |
| 6,834,274 | December 2004 | Tafoya |
| 6,985,771 | January 2006 | Fischell et al. |
| 6,990,437 | January 2006 | Abu Ata |

TECHNICAL FIELD

The present invention relates to an apparatus and method for determining the capability of organizations to successfully manage performance in the face of emerging events given the organization's make-up, its features and characteristics and experience or the like.

BACKGROUND OF THE INVENTION

This invention relates to an apparatus and method for describing and predicting how organizations will perform across the emergence of different types of events. As a descriptive tool the invention accounts for performance by examining the means or processes (e.g., the planning, organizing, directing and evaluation) of people, material resources and events that shape an organization's performance—the way the organization translates ideas, plans and effort into action. As a predictive tool the invention stipulates expected levels of performance in the management of emerging events—what an organization is likely to do in given situations or circumstances.

Whether examined in terms of a means or an end, performance is an important focal point for those interested in understanding what to expect from an organization. Be that organization a business (for profit or not), a military unit or its terrorist adversary, a recreational or professional sports team, performance is a primary indicator of the organization's value, effectiveness, or even attractiveness for existing, new or potential stakeholders. Organizational performance can be so important to stakeholders that whole systems can be created to track, measure and describe if the performance one expects from an organization matches what is observed.

Several factors can influence whether desired levels of performance are achieved, however. For example, people in the organization are among the internal factors affecting an organization's performance. In this instance such tangibles as their competencies or experience and more elusive characteristics like attitudes or beliefs can be important contributors to an organization's performance. Indeed, and as many managers have discovered, virtually every aspect of performance ultimately rests with the choices made at a given moment by people in the organization.

An organization's processes, practices and procedures are a second internal element that can effect performance. Design, clarity, and complexity are typical features of an organization's processes and procedures that can directly effect performance. Processes that are incomplete or poorly conceived or that are needlessly cumbersome or poorly organized may lead to poor performance of both members of the organization or the organization as a whole. Indeed, often errors associated with a final product, action or activity can be associated with a faulty process or procedure.

The organization's internal make-up or architecture represents the "hard" elements of an organization—its structure, the tools, equipment or the materials used to do a job or accomplish a task. An organization's internal features and characteristics provide an indication of the organization's preparedness or capacity to handle challenges to performance. An organization's structure, for example, as defined through its hierarchy can influence performance via constraints or impact on communication and information flows, planning, organizing and evaluation of personnel, projects, programs or the organization itself. So, too, material or equipment may be correct or not for a task, in sufficient supply or not or, in some cases, simply beyond the skills or competencies of those expected to use them.

External factors also can shape an organization's performance. Competitors or the weather are typical examples. All organizations have some form of competitor, some adversary. Competitors are naturally occurring challenges for businesses, sport or recreational organizations and even for charitable or non-profit organizations "competing" for the same limited resources (e.g., charitable dollars.) Like internal factors, external factors such as competitors can have either direct or indirect influence on performance.

Direct effects are obvious. One army attacks another disabling a supporting flank, causing the defending military organization to shift resources which in turn, impacts the performance of the other flanks. In another organization the surprise, early release of a new product catches competing organizations off guard, forcing them to make changes to their product or planned release dates or face loss of sales performance.

Indirect effects can be more subtle but just as dramatic. Laws, rules and regulations posted by a regulatory agency can shape an organization's performance without direct intervention. Even perceptions, apprehensions or anxieties over possible events or actions can shape performance. Concern over an adversary's meeting with a potential ally can have an indirect effect on the performance of organizations as they shape their behavior in terms of what "might" happen or result.

The effects of performance are a product of the mixture direct and indirect factors. A terrorist organization detonates a bomb on an airplane resulting in a loss of life (direct effect) but that same action can result in related indirect effects (e.g., disruptions in travel, loss of revenue, decline in the economic performance of a nation's airline industry or the nation itself.)

Competitors in the form of individuals outside the organization also can affect its performance. An injured consumer brings a lawsuit against an organization for damages forcing the organization to alter performance to manage damage to its image or the claims and legal action brought against it. A politician spreads rumors about an opponent hoping to negatively effect the latter's performance during the campaigning process and, ideally, in the coming election. A basketball player rushes down the court and, in the process, injures the opposing team's best scorer, negatively impacting that team's potential scoring performance capabilities. A contractor misses the scheduled delivery of key components to a manufacturing center forcing that organization to idle production and perhaps miss key performance objectives.

Each of these illustrates ways the actions of individuals or groups outside of one organization can, intentionally or not, effect another organization's performance. Organizational performance also is susceptible to other factors. Natural phenomena like a storm that prevents people from getting to work or damages an organization's facilities can impact performance. A virus, like the flu, which infects a significant portion of the population such that people cannot participate in an organization's activities, can influence performance. Or, at the extreme, the death of a key figure that results in a slow down of performance out of respect for the deceased individual or the termination of activity because the organization cannot function without that person, clearly are negative effects on organizational performance.

Activities and events are designed by organizations typically are expected to have a positive impact on that organization's performance. Programs, especially those designed to improve the performance associated with specific processes, can impact quality, service delivery or the general competencies of those within the organization. These programs often have specific performance improvement goals as their objective. Safety programs can target performance associated with tools or materials while sales and marketing programs can improve the selling performance of a sales force or the buying performance of existing or potential customers. These types of programs change or establish performance patterns that meet certain criteria, for example, a sales quota or market share.

Programs designed to stop types of performance deemed undesirable or inappropriate are widely used. Conflict management programs aim at ending disruptive behavior while substance abuse programs seek to simultaneously stop one type of behavior while reinforcing or encouraging another type of desired behavior or level of performance. Some programs are passive in nature, perhaps seeking to create a sense of awareness about desired or expected levels of performance. At other times, special events like "safety days," or the U.S. government's posted "security threat levels" are associated with programs designed to increase awareness about future potential performance issues more than to improve current performance.

Performance management programs usually seek organization-wide changes. There are programs that aim at improving an individual's performance—especially in instances where the existing performance is problematic. The focus of these performance management programs is captured in the carefully labeled performance criteria or indicators used to gauge performance.

The use of specific criteria or performance indicators is an important feature. In contrast to the broader performance improvement efforts discussed above, these specific programs tend to be "goal" or "other state" oriented (e.g., "let's hit a target of $400 Million in sales for this year," or "Let's be recognized for providing excellent not poor customer service.") Performance management criteria also define both acceptable and unacceptable levels of performance, often within the context of a quantifiable range or scale associated with the criteria and performance.

In these programs performance is not merely good or bad, poor or excellent. Rather, one might describe performance as observed along a continuum, ranging from a high level, for example, "outstanding" or "superior" to a lower level, "exceeds expectations," through a middle point, "meets expectations." Labels like, "below expectations" and "unacceptable" define the continuum's negative side. Describing performance in this manner provides for a broad understanding of what one is observing (e.g., "how much," "how often," "how well") and enables researchers to use higher levels of mathematics in the analysis of the performance observed.

Various tools exist to aid organizational performance management. For example a common theme of some of tools focuses on efforts to improve performance management in areas or systems within or attached to larger organizations. U.S. Pat. No. 6,389,331 issued to Jensen, et al. on May 14, 2002 discloses a facilities management system for buildings. This system monitors performance of a building's different components and is grounded in a.) defining operational parameters for the building's overall management system, b.) global performance indicators for key components (security, heating, ventilation, fire detection) and c.) a means for identifying malfunctioning components of the facilities as they occur. The building's components are networked together enabling the control of entire building from a system of workstations distributed throughout. When a component (heating, ventilation, etc.) fails, an alarm sounds notifying the operator.

U.S. Pat. No. 5,164,983 issued to Brown, et al. on Nov. 17, 1992 discloses a performance management system for use in telemarketing complexes. The system manages current call traffic but can be adjusted to handle new or increasing incoming calls. This enables the telemarketing center to better manage workload and U.S. Pat. No. 6,751,650 issued to Finch, et al. Jun. 15, 2004 discloses a system for monitoring the performance of contractors hired by a firm.

A second performance management theme is reflected in patents describing improvements in the use of tools, equipment or processes associated with their use. U.S. Pat. No. 6,990,437 issues to Abu El Ata on Jan. 24, 2006 describes a method and systems for determining performance metrics associated with a business entity's information system (IS) architecture's optimal performance. Central to this patent is the construction of four models associated with the business entity and its information system (IS). These models include 1.) a business process model representing the organization's business operations, 2.) an applications model for software elements used in performing the business' operations, 3.) a data model that reflects the physical requirements needed to support the software elements and, 4.) a technical infrastructure model representing an IS architecture design that can be implemented to meet the established physical requirements noted in 3, above. Beyond targeting the particular needs and requirements of the business entity's IS architecture design, this patent includes within its scope improvement of performance in the organization's overall information management system.

U.S. Pat. No. 6,834,274 issued to Tafoya on Dec. 21, 2004 illustrates another attempt to improve an organization's performance by targeting an operational practice or system, in this case the manner in which organizations manage knowledge. Creating, updating and utilizing a knowledge database is this patent's focus. The thesis is that better management of information coming into the organization and better management of its storage and retrieval will lead to improved transformation of the information into knowledge and, in turn, improved performance.

A third theme associated with performance management in organizations it that which describes efforts to manage or account for the impact of events on an organization. Attempts to anticipate the occurrence of events vis a vis the organization often appear as early warning systems to help the organization better manage future performance in light of the occurrence of a possible event. The scope of these systems can range from attempts to prepare for events that impact individuals to those which may be of specific impact to certain organizations or, finally, whole groups of organizations or societies. U.S. Pat. No. 6,003,402 issued to Klass, et al. on Jan. 31, 2006 is an example of the first type. This patent presents a system and method anticipating potential Adverse Drug Events (ADE) in a patient's medical regimen. The process described is associated with a loosely constructed organization comprised of patients, lab and pharmacies, and healthcare providers. Key features of this system include 1.) the establishment of predetermined ADE rules defining ranges for lab tests, drugs and Adverse Drug Events, 2.) the use of a database and search engine for comparing lab and pharmacy data and the aforementioned predetermined ADE rules and, 3.) monitoring and communication processes for use throughout the system.

U.S. Pat. No. 6,985,771 issued to Fischell, et al. on Jan. 10, 2006 is another illustration of attempts to manage or account for the impact of events at the individual level. This patent presents a rapid response system for the detection and treatment of cardiac events, for example, heart attacks. In this patent, patients with a history of cardiac events have an electronic monitoring device implanted into their bodies. This device contains information about the patient and has the capacity to detect, for example, when there is insufficient flow of blood in at least one coronary artery. The device transmits a wireless signal to a receiving station when an event is detected and a warning signal alerts the patient of a potential cardiac event.

U.S. Pat. No. 5,521,813 issued to Fox et al. on May 26, 1996 illustrates attempts to examine the impact of events on segments of society or an industry. In this case, this patent (and related ones also issued to Fox et al.) seek to help organizational performance in the retail and related industries by helping mangers improve their buying patterns vis a vis long term weather forecasts. The assumptions behind the Fox et al. patents are that by better understanding future weather patterns and events, clothing manufacturers and merchants, energy suppliers and other weather-dependent organizations could better utilize their physical space, advertising and promotional spending and their overall inventory management strategies.

U.S. Pat. No. 4,656,867 issued to Sasaki on Apr. 14, 1987 seeks to forecast earthquakes by examining the formation of cirrus clouds under certain conditions. This process suggests using satellite or television images of cloud formations and seeks to associate the presence of the targeted cirrus cloud formations with the epicenter of a future earthquake. Finally, U.S. Pat. No. 5,585,558 issued to Zhelonkin et al. on Dec. 17, 1996 also seeks to forecast the occurrence of catastrophic events (i.e., those defined as phenomena what are proceeded by enormous gains in the energy state of a region) like earthquakes, volcanic eruptions, hurricanes, tornadoes, tsunamis or an accident at a nuclear reactor. Forecasts of potential catastrophes are prepared on the basis of information received at monitoring stations distributed across particular geographic regions. These stations are equipped with sensors and other equipment capable of discerning changes in the region's energy levels and, subsequently, communicating observed changes to central locations.

The prior art seeks to describe or forecast system performance vis a vis events, typically around neatly defined variables—a specific type of event, a particular type of setting or, to improve a particular activity. A rigid focus had advantages, but it can leave gaps in the treatment, understanding or use of a solution. The mechanisms and approaches associated with the invention described below address gaps and shortcomings or issues simply not addressed by the prior art.

A primary distinction between what exists and what's offered is that this invention is that it is not organization-specific but can be used across any type of organization. Organizational features like size, complexity or mission are not limiting features. The invention reflects a society's broad setting where for-profit businesses interact with charitable organizations; where large, sophisticated military organizations compete with small, fluid terrorist organizations; and, where organizations established for sports, recreation or leisure must interact with and follow the prescriptions of regulatory organizations.

This invention also approaches events differently than the prior art. The invention is not limited to examining the impact of a specific event or type of event on an organization. The event classification system described herein is unique in that it offers a means for describing, observing and evaluating a typology of events, from those initiated by an organization to those effecting an organization but are not within the organization's span of control. This orientation to events contributes to one's understanding of both events and organizations by allowing for examination of the dynamic nature of each. In this invention, the occurrence of a given event is viewed as a phenomenon which may or may not be the primary factor triggering or demanding an organization's response or testing its capacity to respond. For example, it may not be the emergence of a tornado that will test the organization's capacity to respond, but the resulting floods, fires or injuries associated with the event. Events here are approached in terms of intensity or as potential risks or threats and this allows for finer levels of analysis and description.

A third contribution of this invention over what's available is it's emphasis on anchoring its analysis on the nature and make-up of the organizations studied, thus helping to control for the role of an event vis a vis features of the organization, per se. Metaphorically, organizations are like trees and the events they have to manage are like storms. Some trees bend with the wind, have limb and branch structures which allow for reduced wind resistance and/or root systems that are well-established or deeply embedded in the ground. The ability of these trees to withstand severe storms is very different from those with rigid structure that can break in high winds, that have broader surface resistance areas because of a heavy branch and foliage system or, a potentially weaker, surface root system. This invention isolates elements that define an organization's form and function and includes these in its algorithms, models and processes.

This invention's delineation of the effects of an event on an organization makes a fourth contribution in two ways. First, effects associated with the an event's emergence are viewed as multi-dimensional and are defined in terms of several elements: products, results, impacts and consequences. Viewing effects as dynamic and multidimensional adds perspective and depth to the analysis of ways events challenge an organization's capabilities. For example, rather than simply treating the observed event as the unit of analysis, this invention treats effects as a population of factors (outcomes) comprised of sets of distinct but related elements (products, results, impacts and consequences.) This approach facilitates a more complete explication of the complexities associated with events especially vis a vis the organization.

Secondly, this invention is offers a unique way for conducting an in-depth examination of effects by a.) focusing attention on the inter-relationship among products, outcomes, impacts and consequences and b.) linking, whenever possible, the relationship among these effects to the nature of the event and organization examined. In short, this invention does not stop with, for example, the description and prediction of an event but, rather, sees the obvious event as a manifestation of and sometimes a catalyst for the emergence of subsequent events.

Finally, this invention focuses on performance as a product of the conjunction of both the event and features and characteristics of the organization and, in turn, seeks to describe and predict all three. Centering discussion around performance as a function of the event is a useful tool for understanding the magnitude of events on organizations. This enables studies of concepts like "organizational effectiveness" and the "magnitude of the effects" associated event. Finally, examining these three elements, the organization, performance and the event, in conjunction with one another is a useful way to understand two key organizational transaction points. First, the moment immediately following the event when event-driven performance reigns and, second, that point where system stability and equilibrium are regained so that organization-driven performance (e.g., pursuit of a mission or goals) reigns.

SUMMARY OF THE INVENTION

The need remaining in the prior art is addressed by the present invention, relates to a methodology for determining the capability of organizations to successfully manage performance in the face of emerging events as well as the means for assessing the levels of performance achieved.

In accordance with the present invention, considerable time and effort is first spent isolating, classifying and defining elements common to organizations and to events which may effect organizations. This first step used research investigations that follow a defined protocol, a protocol that includes the surveying of experts and practitioners familiar with the different organizational classifications. A similar process, used to construct to classify events which may effect organizations, resulted in the construction of typologies of organizations and events.

A next step centered on building two models to describe the a.) the relationship between organizations and events and b.) the manner in which events emerge in the context of the organization and, subsequently, effect organizations and their performance. The models are constructed using a logical methodology and are tested for their validity and reliability. The models are structured to correspond to archetypal stages, events or processes that shape the beginning and terminal activities associated with organizational processes. Finally, since the patterns and functions that define these activities are common from organization to organization the models are used across situations, conditions or locations encountered.

While the models reflect interactions among different phenomena, one describing the characteristics, make-up and operation of an organization as a functioning entity and the another explaining the dynamic emergence of events and their effects on organizations, they are inherently related. The link between the two is defined by the manner in which events 1.) simultaneously serve as a catalyst for change in organizations, 2.) serve as an expected part of everyday life within an organization and, importantly, 3.) by the manner in which organizations respond or generate a "self-organized" response to events. The models and supporting materials demonstrate that organizations as a class, while defined by different identifiable sub-classes, can be expected to respond to the same types of events in much the same way unless an organization's capabilities are deficient. The tools developed and described herein provide a means for a.) determining an organization's pre-event capabilities vis a vis baseline criteria, b.) the probability that specific types of events are likely to be produced by different types of effects and c.) the likelihood, given a. and b., of the probability the organization will successfully manage the events that emerge.

Finally, the processes tools described below reflect the dynamic nature of organizations, of events and of the relationship between the two. The models and tools described look at an event's emergence, evolution and related effects as a continuous process, without a defined end or conclusion. This is an important feature of the invention for it understands that part of the magnitude of effect(s) events have on organizations and their capacity to perform lingers on long after the event, per se, has passed.

The same is true for the database developed with this invention. These databases are tools which allow the user to move among elements of a cross-referenced but disintegrated grid structure when examining or managing an event. This facet of the invention facilitates the user's organization of responses to situations, regardless of the user's needs and competencies or the issue at hand (from routine to complex). A general set of "best known method" audits appears at a concluding step to document the effort for historical purposes, to maximize future, related knowledge management applications or, simply, to be used to re-work the process in general.

BRIEF DESCRIPTION OF THE DRAWINGS

Referring now to the drawings,

FIG. 2 illustrates an exemplary rating guide to be used by subject matter experts. This information is used in developing and evaluating the definitions and determining the types of organization categories and operational practices that define organizational performance states and conditions;

FIG. 3 illustrates the four unique organizational classifications against which all organizations are classified;

FIG. 4 illustrates typical organizational practices that are examined for organizations because they can potentially effect performance;

FIG. 5 illustrates an exemplary rating guide to be used by subject matter experts. This information is used in developing and evaluating the definitions and determining the types of competencies and levels of exigency contributing to defining organizational states in organizations;

FIG. 6 illustrates a sketch and method for interpreting the relationships among competency, risk and urgency;

FIG. 7 contains a diagram illustrating an exemplary process for assessing an organization's equilibrium in accordance with the present invention;

FIG. 8 is an illustration of the typology of Organizational Events;

FIG. 11 illustrates the relationship among an event's outcomes with a fourth variable, consequences, defined to illustrate how these outcomes contribute to disturbing an organization's equilibrium or general ability to perform;

DETAILED DESCRIPTION

Figure 1A:
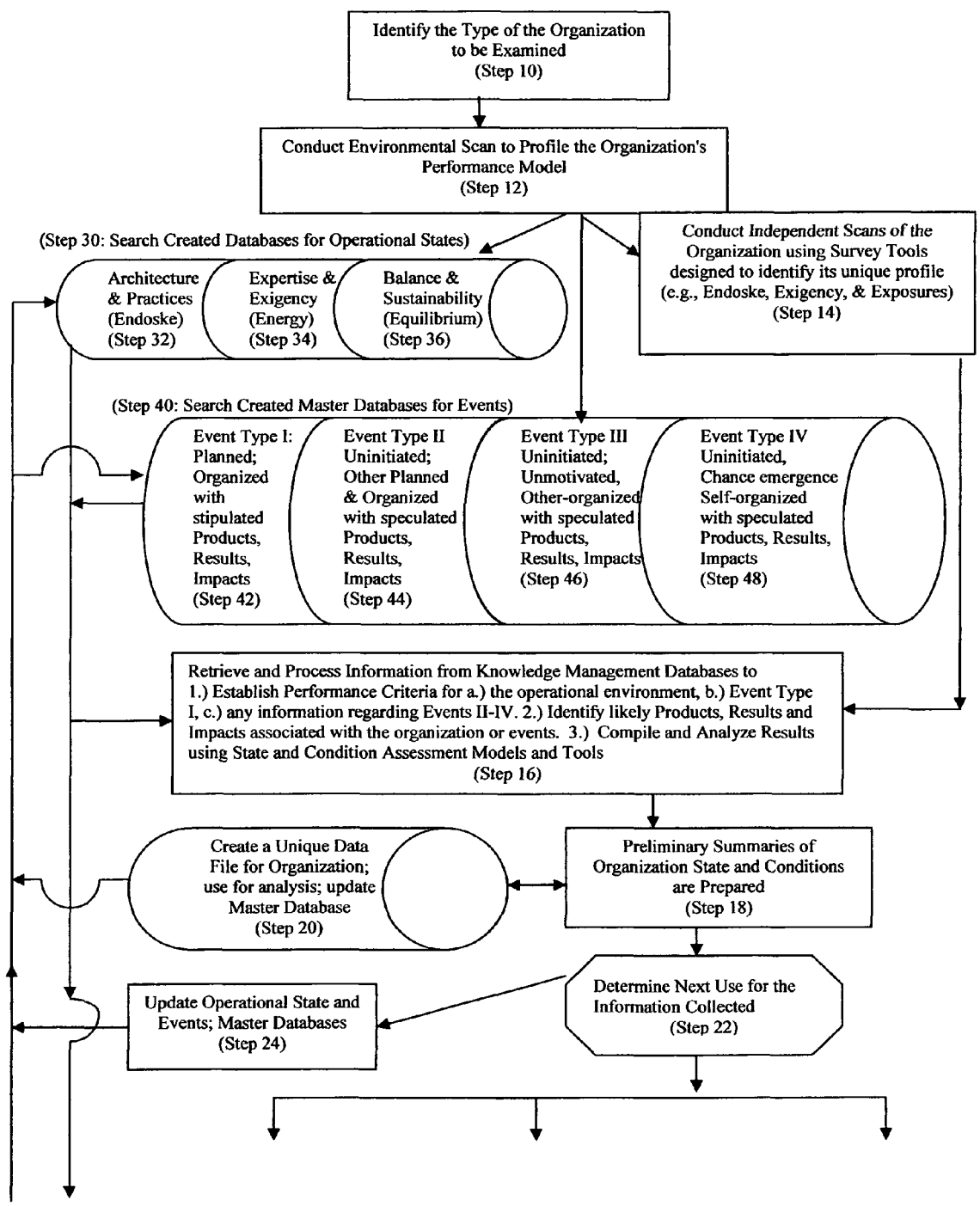
FIGS. 1a and 1b contains an exemplary flowchart illustrating the utilization of a performance management examination and database system in accordance with the present invention.
Figure 1B:
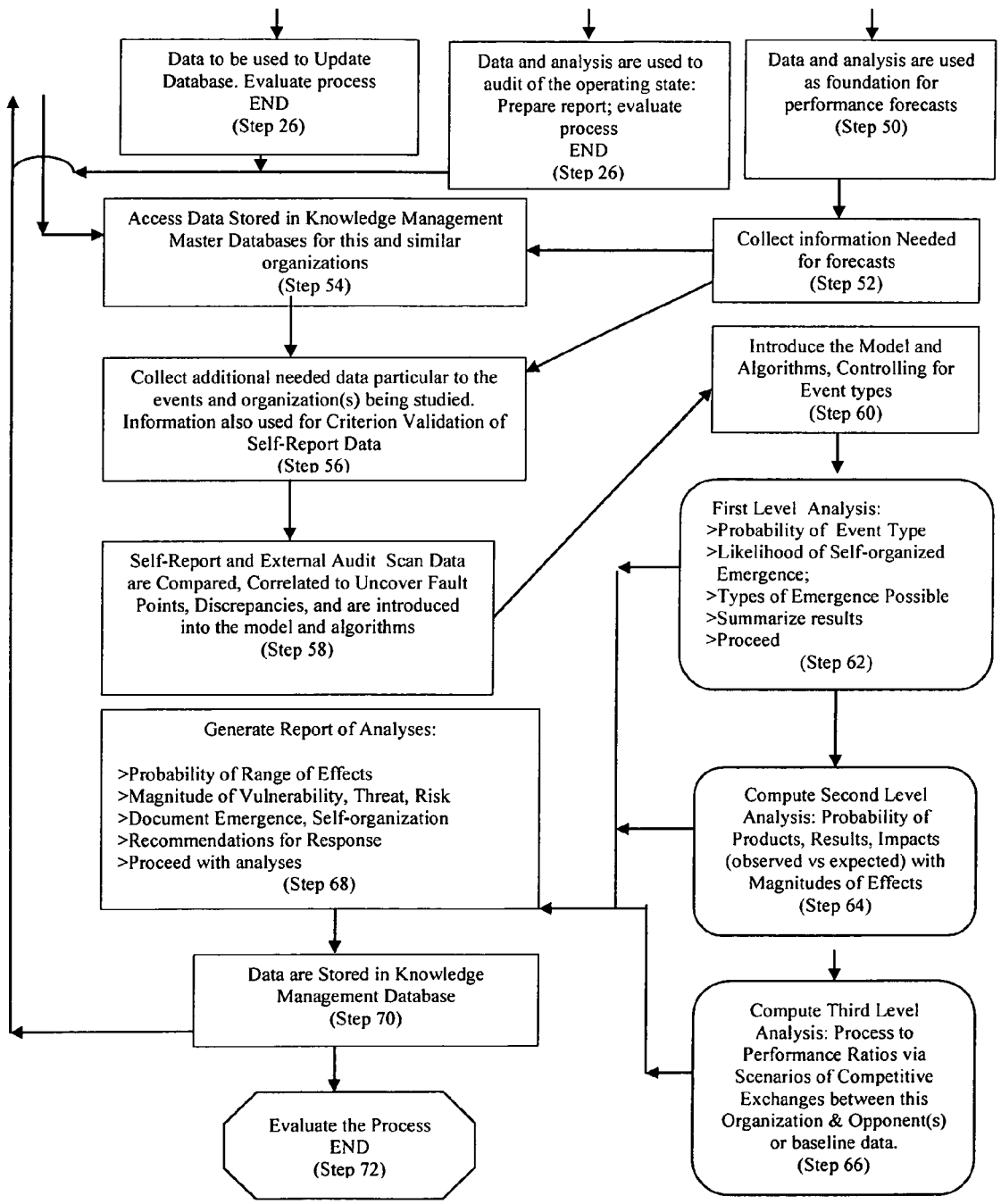

A preferred embodiment of the process flow for the present invention is illustrated in FIGS. 1A and 1B. As shown, the invention and process relates to computer-based systems and methods for the description and prediction of a target organization's performance against expectations and, more specifically, performance across a spectrum of different types of organizations and events. The first phase of the overall analysis begins with the collection and storage of needed data and information. The data collection process begins with a user classifying the type of organization examined (step 10). Expert ratings, based on a defined protocol, are used to classify organizations by type. FIG. 2 illustrates the expert rating form used to classify organizations and FIG. 3 illustrates the four unique organizational classifications that emerge from the rating process.

The organization's broader profile is identified next (step 12). This profile centers on describing the organization's key features and characteristics—especially those essential for this type of organization to meet is performance goals and objectives. FIGS. 4, 5, 6 and 7 illustrate dimensions of an organization that are explored in the environmental scan. For example, information about an organization's operational practices (FIG. 4) can reveal how an organization handles day-to-day events or those unexpected events that emerge at different times in its life cycle.

FIG. 5 illustrates another important feature linked to performance, organizational competencies or capabilities. In this instance, FIG. 5 illustrates that competency is viewed as a multi-dimensional construct and is examined at systemic and elemental levels for the organization and its personnel. The impact of organizational practices and competencies is expanded in the environmental scan when aspects of these two dimensions are explored in terms of organizational exposures (FIGS. 6 and 7), in these instances risks and potential vulnerabilities.

In many respects, the information identified at step 10 tells what one should expect to see or how one should expect a given type of organization to appear while information collected through the environmental scan reveals the likelihood that what was expected can be observed. Once collected data from steps 10 and 12 are stored (step 30) in what will become a master database for subsequent use in this and other research and a unique data file (step 20) containing information only about the target organization.

Once the organization's type is identified and preliminary information about its general make-up is sketched a unique, in depth organization profile is defined (step 14). Two resources are used to complete this step. First, information in the master database (step 30) that describes characteristics of the four organizational types is sourced. This information is organized around three primary elements (steps 32, 34, and 36) which, in turn, are used to define the performance-forecasting model associated with this invention. The database is regularly updated through field operations and investigations like the one described herein. All totaled, the master database is a compilation of several structured collection and classification efforts.

The master database serves as both a repository for data collected about target organizations and a source of content for comparisons of this organization with similar organizations or against other types of organizations. Three sub-categories labeled as the organization's structure or endoske (step 32), energy (step 34) and equilibrium (step 36) define the database. Endoske refers to components defining the organization's structural make-up. For example, FIG. 4 outlines the seven critical practices associated with an organization's structural make-up. Information regarding an organization's critical practices, used in conjunction with information defining the organization's type, serve as elements of the forecasting model used below.

FIG. 5 and FIG. 6 summarize the two other elements of database and the forecasting model. The "energy" factor is comprised of two indicators: an expertise and exigency indices (step 34) with both linked and weighted in terms of the organization being examined. Expertise is a measure of the organization's competencies and capabilities vis a vis the type of organization and it key practices (step 32). FIG. 5 illustrates that expertise is a systemic factor distributed across organizational levels. Exigency is operationalized as a measure of the response demands required given the events at hand (step 40 and discussed in detail below.)

FIG. 6 illustrates the relationship among competency, exigency, and a third variable, risk (step 36). The ordinate of the graph in FIG. 6 defines the boundary between organizational equilibrium and imbalance and illustrates how decisions to act are manufactured in terms of the sense of urgency ("low", "medium" and "high") the event demands. A "low" rating is defined as a "low priority" issue/problem. A "moderate" sense of urgency defines events the organization can address if it has the resources, time, etc. Lastly, a "high" sense of urgency is reserved for this situations demanding immediate action—something needs to be done right away and if the organization does not have the capabilities to manage the event it will seek out what is needed. Clearly, every issue that falls above the graph line in FIG. 6 is a circumstance that can be addressed by using the present invention. The invention becomes a knowledge management resource for each of the three categories below the line, in these instances to augment the competency levels described.

The database's sections that describe organizational "operational states" are completed at step 36. Data here are used to construct summary measures of the organization's profile and defined in terms of balance (equilibrium) and exposure indices. FIG. 7 illustrates one way exposure is conceptualized and rendered from information in the "operational states" database. In this illustration (FIG. 7) rater estimates of an organization's risk, vulnerability, readiness and performance levels are obtained and used to derive a preliminary estimate of the organization's exposure profile.

A second database is available at step 40. This database, the "events database," contains illustrations of four types of events that organizations, regardless of type, may be expected to manage. FIG. 8 summarizes these events as ranging from those planned and within the organization's control to those that are unforeseen, often referred to as "acts of God."

The four categories of events can be further classified in terms of the organization's potential scope of control, in this case as either "high control" (Type I) or "low control" (Types II-IV.) "Control" in this instance is not a descriptive indicator of any "risk-to-the-organization" but is rather an indication of the cause or source for the event's emergence. So the locus of control for "Event Type I" is the organization and for "Events Type II-IV" agents other than the organization.

FIG. 8 contains descriptions and examples of the four event types. The significance of an event to organizations rests with the event's potential to produce positive or negative effects for the organization. For example, an event that places heavy demands on the organization's resources to manage it is a more significant event than one that requires few organizational resources.

Figure 9:
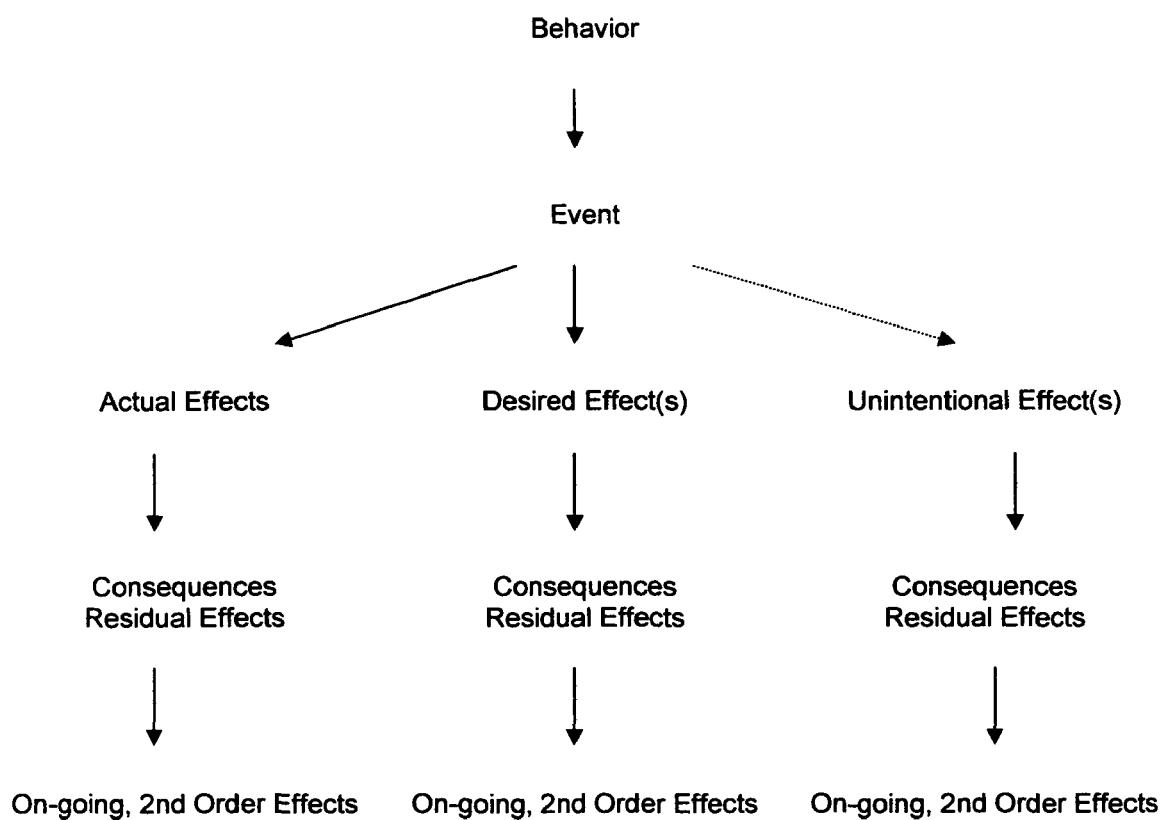
FIG. 9 illustrates the relationship between behavior, events and effects, with special emphasis of different event effects.

FIG. 9 illustrates the range of potential effects associated with an event's construction. The principle point here is that in some cases organizations can anticipate effects possibly associated with some events and then prepare accordingly. This is especially true when the emergent event is a desired, planned event associated with, for example, a specific goal, program or process. However, there is always the possibility that an event may not emerge as planned or that there are unanticipated effects associated with an event—unplanned effects over which those initiating the original event may have little control.

Steps 42-48 reflect the development of a database containing the four types of events (Types I-IV) organizations may experience. (For example, as described in FIG. 8.) Experts are used at different times to identify and classify types of organizations, events and other salient variables (e.g., the potential importance of an event to the organization, etc.) The value of the "events database" unfolds in three ways. First, the database is a means for researching the types of events typically associated with particular organizations or, in turn, those events most likely associated with different organizational types. This information is useful for those engaged in organizational planning or, for example, in certain competitive or evaluative situations such as opponents seeking to judge another organization's potential capacity to manage certain events.

The invention's database is useful to organizations seeking to a.) gauge their own capability (or capacities) for managing events (e.g., step 34) or b.) for establishing performance criteria (e.g., step 16) needed to manage different events given the organization's different operational states (e.g., steps 32, 34, 36.) For example, what should be the performance criteria and expectations for an organization situated in a hurricane prone region of the country? Events are unique because they can vary in weights and magnitudes of importance for different organizations. The "events database" can be a useful tool in identifying the appropriate level or degree of importance.

Finally, the events database is a key tool when exploring or forecasting how an organization might perform or manage different events. Forecasting future performance is a powerful tool for organizations. For example, forecasting potential performance can save costs, resources and, in some instances, lives. The ability to forecast potential performance is important for several reasons. Forecasting creates a sense of awareness of the relationship between the organization and different types of events. Treating all events as though they carry the same weigh or impact is not prudent. The forecasts help the organization distinguish between events given an a priori ranking given the event's saliency to the organization. In this instance, by going through the forecasting process the organization's staff can improve their understanding of not only which events have the greatest potential saliency but why this may be the case. Finally, forecasts are a means for speculating about the outcome of an event. Here, like the point just made, engaging in the forecasting process can contribute to understanding another important impact element of events: the short and long-term effects on the organization as a function of the event's possible outcomes.

Steps 18, 20, 22 and 24 set the stage for the construction of forecasts of future performance. Data collected and/or retrieved from the invention's databases are analyzed and processed and, at step 22, a decision is made regarding the next use of the information. If the data are not to be used for any specific purpose they are added to the "Operational States" and "Events" databases (step 26) and the process ends. If, however, the data are to be incorporated into efforts to forecast future performance the process moves to step 50.

The preparation of forecasts begins with the identification of useful variables and data. These discrete and random variables can include the type of organization, performance criteria, type of event and levels of expectation regarding potential performance. Accessing the data begins at step 54 with a search of the "operational states" and "events" databases. If additional or more current data are needed those are collected (step 56) with an added "evaluation point" (step 58) to ensure the data's integrity and overall appropriateness given the pending analysis.

The first level of analysis, the probability of a target event's emergence, is calculated at step 62. This is both an interesting and important calculation to complete. In the first case the calculation is interesting because it can define and clarify exactly what is meant by "the emergence of event 'x'." For example, in a commercial setting, say a retail organization, the "sales transaction" is the paradigm for an event and performance management but the "sales transaction" is not the unit of analysis or interest, per se. Rather, the levels of quality, of customer satisfaction or, of information exchanged, are better events or units of analysis for study.

The same is true when forecasting performance in extreme situations, for example, the performance of terrorist organizations or military units. Over simplifying the definition of the events (e.g., a "bomb detonation" or a "captured objective") can obscure the real or "true events" associated with organizational performance in these instances and, thus, miss the real issue at hand, namely the organization's ability to perform in the future, beyond this occurrence. The continuity and integrity of performance over time is the true point of interest in these analyses. Clearly, from the organization's point of view, detonation of a bomb or securing a military objective is of secondary importance to factors like "the proximity of the bomb to the target detonation point," "the element of surprise achieved," or, in when talking about a military objective, the "loss of personnel," "the amounts of resources used" or, "the ability to perform under pressure." These are the types of variables that relate directly to the organization's future, continuing performance. In short, these last examples are the types of indicators that point to near and long-term future performance and, ultimately, organizational success.

Secondly, the analysis at step 62 is important because it sets the stage for additional analyses—analyses that explore and attempt to predict the range of effects conceivably associated with the event that emerges, the focus of step 64 below. Completing step 62 begins with the identification of the organization-type, the events under study and stipulation of levels of performance required for the management of each event that may emerge. The variables are identified, the data collected and examined and the information placed in the appropriate model and algorithms (step 60).

Analysis begins with determination of "the probability of the event types" one might expect given the organization(s), the organization-type and, likely "levels of performance management" associated with each event. For example, sales activity between an employee and potential customer may be the key event for a retail organization. The sales transaction is the event environment or context, while the event (i.e., unit of analysis) isolated for analysis is the emergence of "good," or its corollary, "poor customer service." Moreover, the performance expected with the emergence of either level of customer service is defined as a continuum ranging from "exceeds expectations" to "unsatisfactory," given the target event.

Recalling the discussion above regarding the importance of identifying the appropriate units of analysis for these forecasts (i.e., the "true nature of the emerging event," for example, customer service) in contrast with the event environment or context (e.g., the "sales transaction") once the units of analysis are selected it is important that the appropriate forecasting statistic be used to construct the forecast. Moreover, matching statistic to the data to be analyzed means that assumptions inherent with the statistic be met. For example, the following illustrates the types of assumptions that can underlie certain forecasts generated with this invention:

a) for each emerging event there are k mutually exclusive possible products ("performance that exceeds expectations," . . . to . . . "unsatisfactory performance") that are referred to as $P_1, P_2, \ldots, P_k$ and, therefore, a sample space of possible outcomes on each event described as $S=\{P_1, P_2, \ldots, P_k\}$;

b.) the probabilities of products $P_1, P_2, \ldots, P_k$, denoted as $p_1, p_2, \ldots, p_k$ are constant from event to event; and, c.) the events are independent.

Under these assumptions the probability that there will be $x_1$ occurrences of $P_1$, $x_2$ occurrences of $P_2, \ldots,$ and $x_k$ occurrence of $P_k$ in n events is described as:

$$f(x) = \frac{n!}{x!(n-x)!} q^{n-x} p^x$$

As was indicated above, matching statistics (and their inherent assumptions) with the data to be analyzed occurs at step 60 with the actual analysis of the data occurring at step 62.

Once the analysis is complete, results are summarized (step 68) and the process continues to step 64. At step 64 analysis shifts to examination of the effects associated with the event examined at step 62. In this instance, effects are approached as emerging in three ways: as products of the event, as results associated with the event's occurrence and subsequent reactions to the event and its products and, in terms of the event's impact, especially given the resultant products and results. This level and detail in the analysis provides a richer picture of the emergence of an event and whether the event emerges as expected or not.

Figure 10:
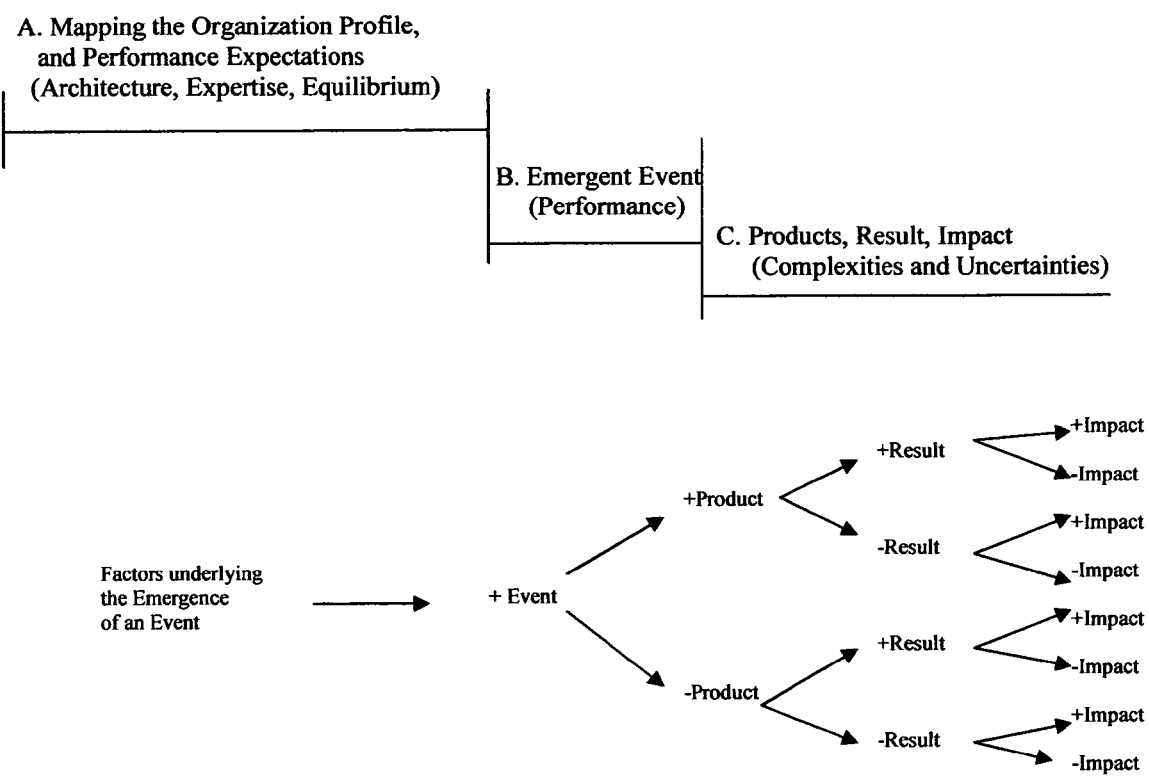
FIG. 10 illustrates the emergence process vis a vis the progressive relationship between the event's emergence and resulting outcomes (products, results and impacts)

The same assumptions noted above for step 62 hold for step 64. What is different is the underlying nature of the probability distribution. FIG. 10 illustrates the progressive relationship between the model documenting the "event emergent process" and the probability estimates made at different points in the process. In this instance, because the effects are diffusing into the three emergent forms, products, results and impacts, the complexity of the process increases over time (literally, from discrete to dynamic) and, as a result, the strategies for analysis vary correspondingly, concluding with step 66 described below.

The assumptions associated with the conditional probability distributions produced at step 64 are the same as those at step 62. The focus of the analysis is the calculation of the conditional probability that X, a target event, takes on particular values corresponding with a particular product, then result, and then impact. The relationship is conditional because we assume that associated with every occurrence of X (an event) is Y (a product—and result and impact.) This relationship is defined as:

$$P(A|B) = \frac{P(AB)}{P(B)}$$

The delineation of Products, Results and Impacts associated with an event is the center of step 64. FIG. 11 defines these three elements and the relationship among them. It also contains a fourth element, "Consequences," adding a broader perspective of what the total scope of effect might look like for a given event. Overall, the effect on the organization reflects a broader diffusion effect that, in the case of negative products, results and impacts, serve to destabilize the organization's equilibrium while those that are positive tend to have supportive and/or enriching effects on the organization's equilibrium. The analysis ends with the preparation of a report (step 68) but the process continues to the third level of analysis, step 66.

Step 66 allows for comparisons within, between and among organizations. The analysis begins by using data collected at the completion of steps 62 and 64 as baseline information on the target organizations. The analysis proceeds by completing three tasks. First, target organizations are compared to define their differences and similarities, especially across key dimensions (e.g., competencies, strengths, and vulnerabilities.) Second, preliminary probability estimates are made isolating each organization's leverage or advantage points. Finally, the extent to which one can observe the emergence of new processes, especially processes self-organized around the emerging event, are examined.

Self-organization is refers to the development of strategies, behaviors and actions by individuals without the direct influence of external agents. In the context of this invention, self-organization focuses on those instances when individuals in organizations, acting alone or in collaboration with others, initiate the construction of an event (e.g., response to a problem). The process of self-organization as defined by this invention is important for several reasons. First, self-organization is a fundamental element defining what an event will look like and is how the event is likely to unfold, regardless of any pre-event planning or preparation. Self-organization is a unique phenomenon; it is the "way" preparation, training, thought and vision are translated into action and activity.

Organizations see examples of the self-organization process every day. Organizations spend tens of thousands of dollars on employee training and coaching then lets the employee take charge of the setting and, at best, "hope that all goes well." Taking charge or taking matters into one's own hands is an accepted practice. Indeed, most organizations could not function if its membership did not act as self-directed agents on the organization's behalf at some point.

In retail organizations, for example, employees manage customer interactions, take money on behalf of the organization, receive and track inventory and, can even be responsible for unlocking and locking the organization's doors at the beginning and end of a work period. When the individual performs these types of actions the individual constructs behavior and actions which, despite all training, instruction and preparation, reflect his/her own interpretation of what is expected or what is demanded given the situation. In short, the individual self-organizes to meet the task or assignment at hand. When, in the course of addressing expected events, the individual's actions or behavior match what the organization expects then, all things considered, things are fine.

Self-organization also is important because, especially in those cases where prior training or instruction is absent, self-organization is the individual's own best guess on what to do or how to proceed. This is especially true in extreme situations, for example, the emergence of a crisis or disaster. Certain organizations, in anticipation of threats or because they recognize they are exposed to certain risks or have particular vulnerabilities, prepare for the possibility of known negative events. (For example, if the organization operates in an area prone to flooding it constructs buildings able to handle those events and/or it trains staff on procedures and practices should these extraordinary events emerge.)

Unfortunately, too, unforeseen events emerge despite preparations or forethought. For example, a plane crashing into a building is an extreme event but within the scope of most "emergency response organizations" (police, fire and rescue) to respond too. On the other hand, a group of students who take weapons and use them to attack their school and its membership is an extreme event most educational organizations were not prepared for prior to the Columbine disaster, despite the fact that that type of event has occurred in other organizations (the U.S. Post Office, for example.) How organizations behave in these instances, when the event is unforeseen, or extreme beyond the horizon of expectation, is still important to understand and is within the scope of this invention.

Finally, every organization experiences a variety of naturally occurring events that change the organization in some way. Rapid growth or decline in membership, a merger with another organization or, introduction of new technologies or processes that are beyond the current competencies or capabilities of its membership are events that demand a change in the way things are currently done. When organizations begin to manage system-wide change events, self-organizing behaviors seem to emerge throughout the organization. These behaviors may be a simple response to what has occurred, sometimes they are coping mechanisms, other times as logical elements of a broader problem solving or search effort and, still at other times, as appropriate learned responses. Regardless of what the nature of the self-organized response associated with the event, the stage is being set for the future organization that will emerge out of the change process.

Figure 12:
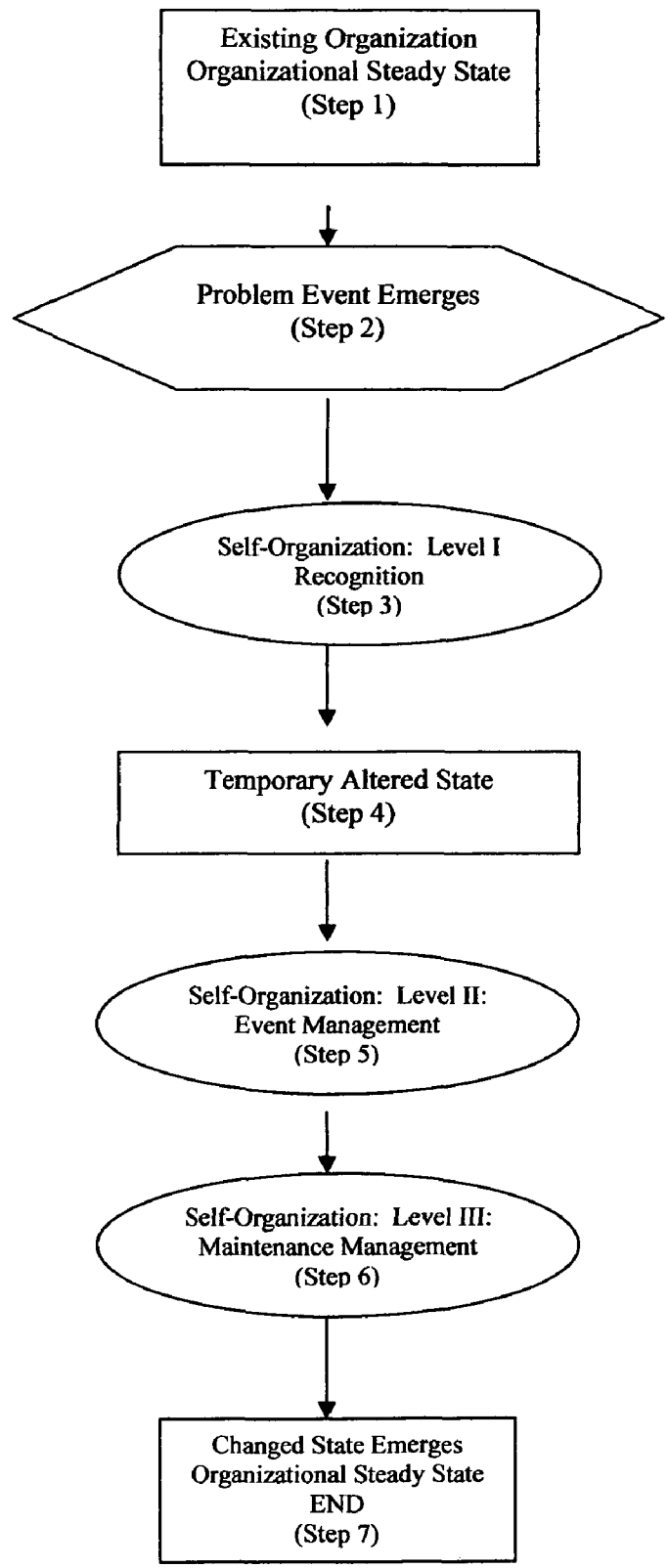
FIG. 12 models the general nature of the self-organization process.

The invention described herein addresses each of these phenomena FIG. 12 models the general self-organization process. This analysis enables the description of various underlying processes and products and the isolation of key measurement points. At step 1 the organization functions as expected (and as reflected in the discussion above through, for example, FIGS. 3, 4 & 5.) The organization's general emphasis at this step is on realizing its mission while managing risk given the resources at its disposal (e.g., FIG. 6.) Overall, the organization is assumed to be functioning at a "steady state": people and the organization perform as trained or expected with the emergence of any events either anticipated or, at best, perceived as within the scope of the organization's capacity to respond.

Step 2 reflects the emergence of a problem event. This event can take various forms (cf. FIG. 8) because of the dynamic nature of the organization and its environment. Because the event is an aberration or otherwise different than what was expected the event disrupts the relative "steady state," either locally or globally. Disruptions can materialize as demands for the shifting of resources to the termination of organizational activity. The invention capitalizes on the overt nature of disruptions by comparing the likelihood of probable disruptions with that which occurs. Profiles generated of the disruptive event enable study of the intensity, magnitude and overall effects on the organization and its capacity to function.

"Recognition," (step 3) is often more subtle than overt. At this step the nature of the threat, it's scope and scale, and potential for harm to the organization are documented and, assuming the needed operational practices (e.g. FIG. 4) are in place, they are researched, communicated and measured. The measurements at step 3 target two factors. First, a "gap" analysis examines the match between practices, policies and procedures versus the needs at hand and second, the extent to which existing practices translate into action is determined.

The temporary altered state at step 4 is unique for two reasons. First, it serves as a bridge that enables operations to continue despite the disruptive nature of the event effects. This is important so that the organization can continue to function, albeit in a different state. Second, the altered state serves as a template that the organization uses as it manages and emerges from the event (e.g., in the case of a catastrophe.) The focus of this emergence is the design and development of a structure or framework of the "new" organization. (Not surprisingly this structure often reflects anticipation of future occurrences of recent events.) The invention's databases (outlined in FIGS. 1a and b.) can serve as a resource for the analysis, planning and design efforts that occur at step 4 in FIG. 12.

At step 5, activity shifts to focus on the event at hand as resources and energies are devoted to strategies for the management of day-to-day operations and strategies to handle the event. Here the invention estimates the likely efficacy of strategies given historical data, the nature of the event and the organization's management profile.

The third and final level of the self-organization process occurs at step 6. It is important to keep in mind throughout the self-organization process and especially at step 6 that it is impossible for the organization to not be effected by the emergence of the event. So, at step 6, two primary alternatives are examined. First, that as the event and its effects are stabilized, the organization regains control and is able to continue albeit in some changed form (i.e., as caused by the event and/or change process.) Or, second, the organization succumbs to the event's effects and becomes dramatically transformed, perhaps ceasing to exist. (For example, a hostile takeover attempt of one organization by another might result in a merger of the two or a complete absorption of one by the other.) Regardless of the outcome, some measure of the event's effects can be established; sometimes in minor changes (e.g., new polices or procedures) or other times in more dramatic ways. The process ends (step 7) with the organization regaining a measure of stability and equilibrium either as a facsimile of its former self or as some new entity.

In summary, the foregoing has described, with reference to particular embodiments, an invention used to describe, explain and/or forecast an organization's performance in the management of events that either emerge through the organization's design (e.g., planning and actions) or that emerge as a result of factors outside the organization (e.g., natural events or the actions of others.) It will be apparent to those skilled in the relevant art that changes in the art's form and detail are possible without altering the spirit, scope or scale of the invention. This is particularly true in light of the applications of technology to the invention that may be developed later.

The same observation is true for the invention's scope and scale of application to organizations. Again, practitioners familiar with the field will see the invention is not limited to use with one or two types of organizations but, as has been suggested throughout this document, is appropriate for use with any type of organization and any type of event, whether planned or not planned. Finally, the invention should not be limited by any of the described exemplary embodiments but should be defined with the following claims and their equivalents.

What is claimed is:

1. A method for forecasting organizational performance, comprising the steps of:
   a) gathering information through at least one survey of an organization and storing the information in an electronic database; based on the gathered information, classifying the organization into one of four types of organizations, wherein the classification types consist of: an enterprise, a team, a community or an individual; and
   b) based on the gathered and stored information, evaluating and determining the organization's architecture and practices, expertise and exigency, and balance and sustainability; and
   c) based on at least the data determined in step b), generating a conceptual graph that maps a relationship between an organization's levels of expertise and the level of urgency necessitated by an event facing the organization, wherein the conceptual graph depicts a threshold indicating the corresponding level of urgency the organization is capable of meeting;
   d) based on the gathered and determined data in steps a) through c), generating assessments of an organization's risk, vulnerability, readiness and performance levels;
   e) defining possible Event Types an organization may face:
      wherein a Type I Event is planned and directly attributable to the mission, goals and objectives of an organization;
      wherein a Type II Event is directly attributable to the organization's presence in an environment and prompts a response by the organization;
      wherein a Type III Event is directly attributable to negligence, carelessness, slipshodness, inattention and/or an omission of an organization and is not a positive event;
      wherein a Type IV Event is not directly attributable to the organization's presence, action or inaction and is not a positive event;
   f) based on the Event Type and information gathered and determined in steps a) through d), predicting products, results, impacts and consequences of the various events;
      wherein the products are defined as first order outcomes of an organization's efforts in response to an event;
      wherein the results are defined as second order outcomes resulting from the products provided by the organization;
      wherein the impacts are defined as an end result directly and indirectly attributable to the products and the results;
      wherein the consequences are defined as a combination of all directly and indirectly attributable effects of the products, the results and the impacts; and wherein the consequences define an ultimate end result of the organization's efforts;
   g) storing the information gathered and determined in steps a) through f) in the electronic database.

* * * * *